Figure 2:
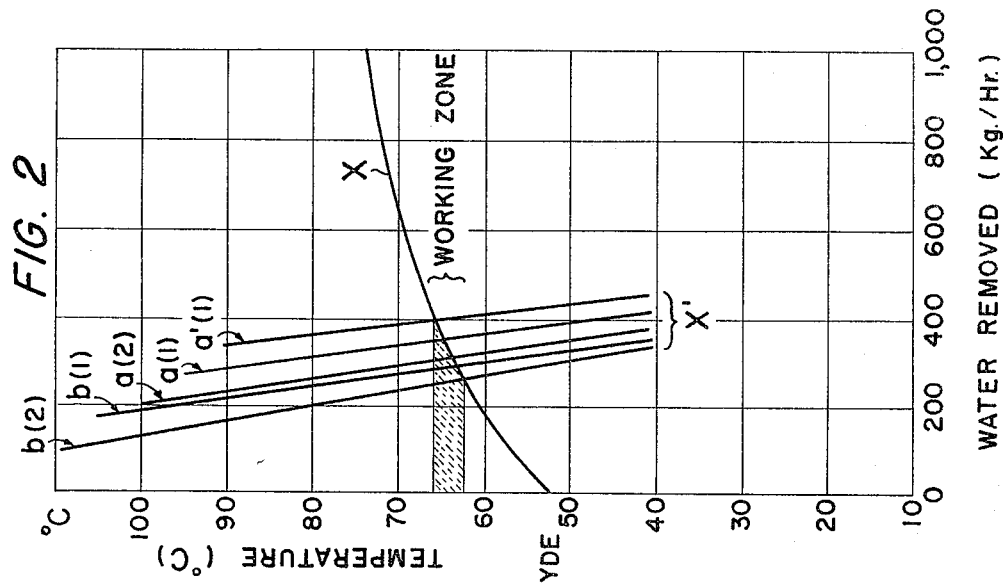

INVENTORS
ANDRE G. F. LEFEBVRE
ROGER D. G. ENGLEBERT
ARTHUR V. J. GEUKENNE

BY
Curtis, Morris and Safford
ATTORNEYS

United States Patent Office 3,288,790
Patented Nov. 29, 1966

3,288,790
PRODUCTION OF HEXAMETHYLENE TETRAMINE
Andre G. F. Lefebvre, Liege, Roger D. G. Englebert, Angleur, and Arthur V. J. Geukenne, Brussels, Belgium, assignors to Societe Belge de l'Azote et des Produits Chimiques du Marly, Liege, Belgium
Filed Mar. 4, 1963, Ser. No. 262,413
Claims priority, application Great Britain, Mar. 5, 1962, 8,475/62
12 Claims. (Cl. 260—248.6)

This invention relates to the production of hexamethylene tetramine by reaction of ammonia and formaldehyde and, more particularly, to effecting such production for commercial scale operations at more or less constant temperatures and without high vacuum or other complicating or expensive controls or conditions previously necessary or conventional for obtaining optimum or enhanced product yields and purity.

As will be understood, hexamethylene tetramine (hereinafter referred to as "hexa" for simplicity) may be synthesized as a reaction product of ammonia and formaldehyde in accordance with the equation:

$$6CH_2O + 4NH_3 \rightarrow C_6H_{12}N_4 + 6H_2O + 178 \text{ Kcal.}$$

and it is to this type of synthesis reaction to which this invention generally relates. As noted, the reaction is strongly exothermic and capable of producing high yields under a variety of operating conditions, providing, generally, that such circumstances as the physical state and concentration of the reactants and the nature of the reaction medium permit a relatively easy and wide control of reaction temperature.

For example, such a synthesis may be performed as a gaseous phase reaction under the variety of pressure and temperature conditions, with the reactants injected directly into an aqueous solution of hexa or introduced at the foot of a column down which flows an aqueous solution of hexa finally divided at the top of the column. With such techniques, however, certain difficulties or disadvantages may be experienced, among which may be noted the necessity for working at high vacuum, the need for substantial external cooling of the reaction, difficulties in eliminating water (either that produced by the reaction or that contained in the reactants), etc. Particularly in commercial scale installations, such fairly critical operating conditions may be undesired as requiring fairly high extra expenditures of energy and/or introducing other undesired complexities into the design of apparatus, the operation of the installation, etc.

In such situations, it may be found that minimizing inherent disadvantages, such as those noted above, may require substantially wide variations of reaction temperature, even to an extent where maximum yield (particularly in the absence of secondary or by-product formation) may have to be sacrificed or compromised for commercial operation.

According to this invention, however, there are provided processes and techniques for the continuous production of hexamethylene tetramine so as generally to avoid such disadvantages and, particularly, providing easy adjustment of the reaction temperatures and readily controlled elimination of the water without recourse to external cooling devices and/or high vacuum operating techniques. Indeed, operations in accordance herewith are selected for the reaction temperature to remain substantially constant, even with variation or modification of other operating conditions or factors such as temperature of the reactants, weight ratio of hexa to the resultant mother liquor, etc., so that stabilization of the reaction temperature is achieved for maximizing production of hexa from the synthesis and minimizing undesired by-product formation. Generally in accordance herewith, gaseous formaldehyde and anhydrous gaseous or liquid ammonia are introduced into a reaction zone containing a saturated solution of hexa, while there is continuously withdrawn from the reaction zone a saturated solution of hexa containing undissolved hexa crystals (to be separated from the mother liquor and recovered), while the mother liquor is then diluted with water to form an unsaturated hexa solution recycled to the reaction zone after gaseous reactants from the reaction zone have been introduced into the unsaturated solution, and with such operations being conducted within a temperature range of about 62° to 66° C. and under pressures substantially equal or close to atmospheric.

With the foregoing and additional objects in view, this invention will now be described in more detail, and other objects and advantages thereof will be apparent from the following description, the accompanying drawings, and the appended claims.

Figure 1:
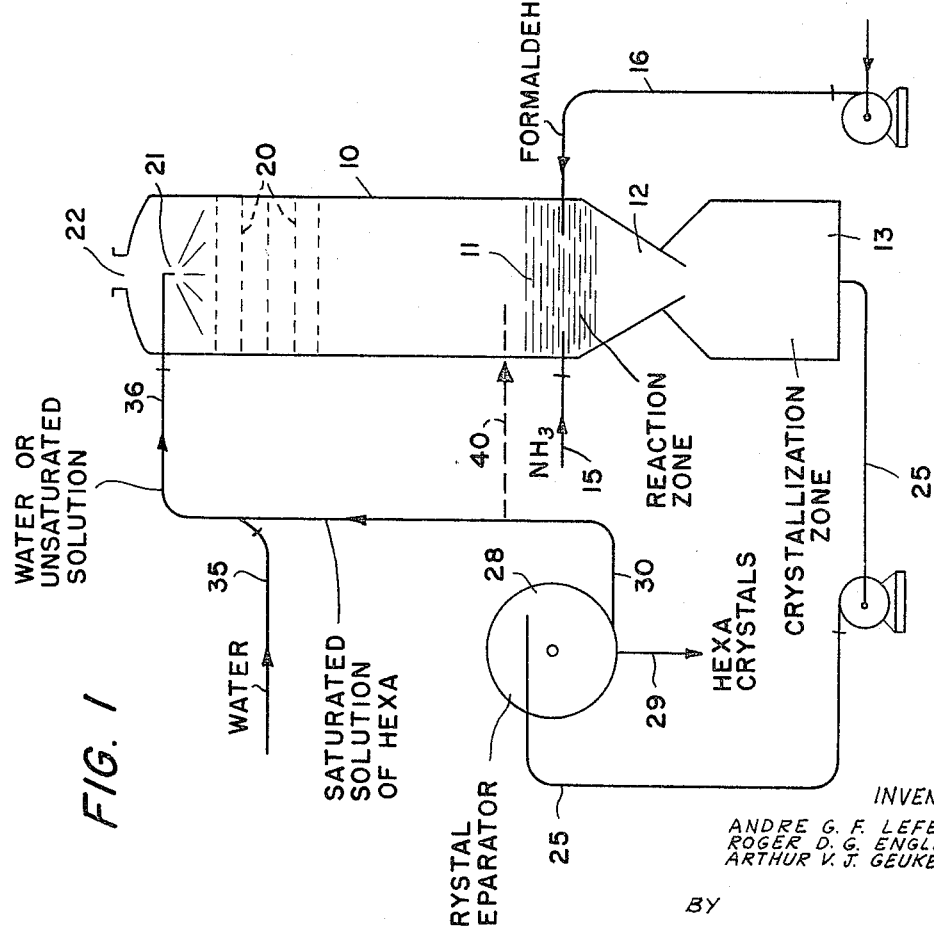

In the drawing:

FIG. 1 is a diagrammatic or schematic flow sheet illustration of a system and sequence of apparatus and process steps embodying and for practicing this invention; and FIG. 2 is a graphic representation of various operating conditions for the arrangement of FIG. 1.

Generally in accordance herewith, the ammonia and formaldehyde reactants are introduced for reaction into a substantially saturated aqueous solution of hexa in a reaction zone so arranged that the level of such saturated solution can be controlled therein. Such portions of the gaseous reactants as escape from the solution in the reaction zone are contacted or washed with either an unsaturated solution of hexa or water alone, for return of such escaping gaseous reactants to the reaction zone. From the reaction zone there is withdrawn a mother liquor or saturated solution of hexa in which are included or suspended hexa crystals (or in which crystals are allowed to form), which crystals are separated from the mother liquor and the latter returned as a substantially saturated solution to the reaction zone or diluted to unsaturated condition for washing the escaping gaseous materials prior to return to the reaction zone.

Although a variety of sources of the initial reactants are available for satisfactory results in accordance herewith, the processes and techniques hereof are particularly adapted to the utilization of a diluted gaseous formaldehyde material such as may be obtained during the catalytic oxidation of methanol and containing as little as 6% by volume of formaldehyde admixed with various inert gaseous components. Similiarly, it is preferred in accordance herewith that the ammonia utilized be in a substantially anhydrous state, either in gaseous or liquid form initially. Indeed, in view of the highly exothermic character of the hexa synthesis, the desired control and self-stabilization of the reaction temperature is somewhat more readily achieved in accordance herewith if the ammonia reactant is introduced in liquid form so as to take advantage of the cooling resulting from the vaporization thereof.

More specifically, and referring to FIG. 1 of the drawings as illustrating a system of apparatus embodying and for practicing this invention, a reaction column 10 is shown having a reaction zone 11 in the lower portion thereof and a bottom outlet portion 12 leading directly to a crystallization zone or vessel 13. Conduits 15 and 16 are provided for introducing the ammonia and formaldehyde reactants, respectively, into the reaction portion 11 of column 10.

In the upper portion of column 10, means are provided for washing or contacting gaseous reactants escaping from reaction zone 11 with either an unsaturated aqueous solution of hexa or washing water, as noted in more detail hereafter. Such means may include bubble cap plates, indicated at 20, or other purely conventional liquid-gas contacting mechanisms, and with the water or unsaturated solution being sprayed or atomized through the rising gases as by a spray head indicated at 21 for return of reactant components therein to reaction zone 11, while inert or non-reactive gaseous components exit through outlet 22 in the top of column 10.

Hexa crystals dispersed in a saturated mother liquor of aqueous hexa solution are withdrawn from reaction zone 11 into crystallization apparatus 13 (and/or allowed to form therein), and the resulting crystal dispersion withdrawn from crystallizer 13 through conduit 25 for introduction into a conventional crystal separator (such as a centrifugal drier) 28, in which the hexa crystals are separated from the mother liquor and withdrawn as the desired product through outlet 29, while the saturated mother liquor hexa solution leaves drier 28 through conduit 30. Depending upon a particular operating condition as indicated below, the saturated mother liquor from separator 28 is either diluted with water (through conduit 25) and introduced as a gas washing medium through conduit 36 to spray head 21 in the top of column 10 or, on the other hand, is directly introduced into or slightly above reaction zone 11 as through conduit 40 (the optional or alternative nature of which is indicated by dotted lines in the drawing), while pure water is introduced through conduit 35 to spray head 20 for the gas washing section in the upper portion of column 10.

Actually, it is believed that little or no reaction of the formaldehyde and ammonia occurs in the gas washing upper section of column 10 so that, whereas it may be preferred to utilize diluted or unsaturated mother liquor as a gas washing medium, satisfactory results are also achieved by utilizing plain water. For the same reason, the absence of substantial reaction in the upper portion of column 10 indicates that whatever means are disposed therein for removing escaping reactants from the gas flow may be satisfactorily arranged primarily to promote efficient and complete washing of reactants from the gas, and may not necessarily require plates or other holdup apparatus for permitting formaldehyde-ammonia reaction in the gas washing zone (the optional character of such plates 20 being indicated by the dotted lines showing thereof).

Preferably, the arrangements are operated such that substantially the entire reaction occurs in reaction zone 11, without premature crystal formation in other portions of column 10, and especially without crystal formation in the gas washing stage in the upper portion of column 10. For this reason the formaldehyde and ammonia reactants are washed from the rising gases by substantially dilute and unsaturated hexa solution or by plain water. By controlling the concentration of hexa solution in reaction zone 11 to be substantially saturated, crystal formation begins in the reaction zone for ready completion in crystallizer 13. Furthermore, under preferred conditions, the actual reaction takes place at temperatures well below the boiling point of the saturated solution, thus greatly reducing the possibility of undesired secondary reactions, especially in the presence of a slight excess of ammonia, while such conditions also promote the obtaining of the desired hexa product in the form of fairly fine crystals.

As noted, efficiency of the reaction and desirably enhanced yields depend to a substantial extent upon the temperature and/or constancy or stability thereof in the reaction zone. In operations in accordance herewith, the reaction temperature in zone 11 is readily dependent upon and/or controlled by a variety of factors including such considerations as the amount of water introduced through spray head 20 at the top of column 10 (either as pure water or water of dilution in the unsaturated mother liquor) and the amount of water, either introduced through spray head 21 or produced in the reaction, that is swept out of the system by inert gases leaving column 10 at outlet 22.

For example, and as purily illustrative of such considerations, if the orginial formaldehyde reactant is obtained by the catalytic oxidation of methanol and is introduced as a gas containing about 6% by volume of formaldehyde, with the remainder of the mixture being gases essentially inert to this reaction and comprising principally oxygen, nitrogen, carbon dioxide and water vapor, such volume of inert gases may be saturated with water as they escape from reaction zone 11 and pass through the gas washing section in the upper portion of column 10, thus to remove an amount of water which will depend primarily on the temperature of the reaction zone 11. More specifically, and referring to the chart of FIG. 2, the curve X represents the maximum amount of water (in kg./hr.) fed into the top of column through spray head 21 at different temperatures that is or will be removed by the rising gases flowing out of outlet 22 at the top of the column. The several curves X' represent the various amounts of water that can be fed into the top of column 10 at the different reaction temperatures noted and to provide for withdrawing mother liquor from reaction zone 11 at various concentrations and to maintain a given reaction temperature.

Thus, using gaseous formaldehyde introduced through conduit 16 at a temperature of about 110° C. and gaseous anhydrous ammonia, the curve $a(1)$ indicates the water introduction and removal conditions consistent with withdrawing from outlet 12 of reaction one 11 a crystal-containing mother liquor having a ratio of hexa to mother liquor of about 50/50 by weight, while the curve $a(2)$ indicates the conditions for a hexa-liquor ratio of 20/80 by weight. With the same formaldehyde feed but using liquid instead of gaseous ammonia, the conditions for withdrawing the same mother liquor concentrations are indicated by the curves $b(1)$ and $b(2)$, respectively, while the curve $a'(1)$ indicates the situation for achieving a 50/50 mother liquor ratio using gaseous ammonia and a formaldehyde feed at about 135° C.

As will be apparent from the foregoing, the control of water introduction and removal permits ready control of reaction temperatures to maintain them in zones of desired maxima and, indeed, without the provision of expensive or complicated external cooling of the reaction zone or vacuum operations, despite the highly exothermic character of the reaction. All other conditions remaining equal, as will be noted, other primary control factors are such considerations as the temperature of whatever inert gases are introduced along with the formaldehyde and depended upon to sweep water vapor from the system, the temperatures of the ammonia feed itself (especially, whether liquid or gaseous), the amount of water that is drawn off from the reaction zone along with the hexa crystals as a part of the mother liquor, etc. Such ancillary factors or considerations, however, are readily controlled within wide limits as may be desired, thus permitting the principal control of reaction temperature to be achieved merely by controlling the water volume flow through the system—e.g., satisfactorily merely by visual or automatic control of the liquid level in reaction zone 11 in known manner and/or utilizing conventional liquid level control means.

Since it is preferred, for optimum results and yields of the synthesis reaction, that the normal operation of the column 10, particularly with continuous operations, remain substantially stable. By considering the data expressed in FIG. 2, it will be apparent that the reaction temperature range (indicated by the shaded area designated as "Working Zone") is established substantially automatically in accordance herewith at the points of intersection of curve X with whichever one of the curves X' designates the particular desired results. Conversely, automatically maintained operating temperatures may be read or established directly, for any given product result, in terms of water introduction and removal. Thus, purely as illustrative and as indicated in FIG. 2, reaction temperatures are automatically stabilized within the range of from about 62° C. to 66° C. during the hexasynthesis in accordance herewith under various conditions where the original reactants are ammonia and dilute gases containing about 6% by volume of formaldehyde at a pressure of 760° mm. Hg, where the temperature of the formaldehyde-containing gases may vary between 110° C. and 135° C., where the anhydrous ammonia is gaseous or liquid (i.e., at temperatures between about 50° and 10° C.), and to provide for the desired withdrawal of mother liquor with hexa crystals therein having the indicated hexa-liquor weight ratios of 50/50 or 20/80.

By comparison, should the process be operated at temperatures, of for example, 60° C., under any of the flow conditions depicted on FIG. 2, the amount of water fed into column 10 would be greater than the amount of water vapor which could be swept away by the existing gases, and the liquid level in column 10 would eventually increase to overflowing. On the other hand, if the system were operated at a temperature of 70° C., the excessive removal of water vapor by the large volumes of flowing inert gases would eventually reduce the level in the reactor to an inoperative extent. Thus, following the teachings hereof, completely sable conditions within the reactor as to temperature, throughput, and concentration of product withdrawn are all stabilized as desired merely by reference to maintaining a certain liquid level in reaction zone 11. Also, as apparent from the foregoing, the actual reaction temperature may be varied as desired, and even without modification of the temperature of the reactants or the amount of water fed into column 10 or drawn off from outlet 12 thereof with the mother liquor, merely by providing for more or less water-removing inert gas flow—as, for example, by operating reactor 10 at a somewhat reduced pressure or by introducing along with the formaldehyde feed a greater proportion of inert gases capable of sweeping water from the system.

Merely as further illustrative of operations and techniques in accordance herewith, several actual examples with which satisfactory results have been achieved may be noted.

Example I

Utilizing a system of apparatus substantially as indicated in FIG. 1, there was fed into column 10 through conduit 16 a quantity of 235 m.$^3$ of a gas mixture containing 6.1% by weight formaldehyde (at the rate of 13 kg./hr.), with the remaining portion of the gas mixture being principally nitrogen, along with smaller proportions of oxygen, steam, and carbon monoxide. Through conduit 15, there was also introduced anhydrous ammonia at the rate of 5 kg./hr. at a temperature of 20° C. The formaldehyde gas mixture was fed at a temperature of 110° C. Operating at atmospheric pressure, the reaction temperature in zone 11 was maintained at about 64.5° C.

The saturated solution of hexa mother liquor and crystals was allowed to flow continuously and directly into crystallizer 13, from which it was continuously withdrawn and the crystals separated from the mother liquor in separator 28. Mother liquor at the rate of 24 liters per hour and containing 27.5% by weight dissolved hexa, was withdrawn from separator 28 through conduit 30 and diluted with 12.5 liters per hour water to form an unsaturated hexa solution introduced into the top of column 10 through spray head 21 therein at a temperature of about 20° C. For enhancing countercurrent contact of the diluted hexa solution and rising gases in column 10, three plates 20 were utilized, so that the inert gas leaving reactor 10 through outlet 22 was substantially completely saturated with water vapor. In this manner, the gases leaving reactor 10 through outlet 22 (at the noted reaction temperature of 64.5° C.) carried out of the system an amount of water substantially equal to the sum of the quantities of water fed into the system with the unsaturated hexa solution through spray head 21 plus water formed by the formaldehyde-ammonia reaction in reaction zone 11, and such control was maintained, as was the stability of reaction and temperature, merely by observation of the liquid level in reaction zone 11. Under these conditions, voluminous hexa crystals were obtained and at the desirably enhanced yield of 99.8% based on formaldehyde input and at 98.5% based on ammonia input.

Example II

In this instance, 220 m.$^3$/hr. of a gas mixture containing 5.84% by weight formaldehyde was introduced, along with 4.47 kg./hr. anhydrous ammonia into a saturated solution of hexa, and the reaction temperature of the reaction zone was maintained at 64.5° C. A portion of the saturated reaction solution was withdrawn continuously, and, after passage through crystallizer 13 and the centrifugal separator and crystal drier 28, yielded 19.5 liters per hour of a mother liquor containing 29% hexa. That mother liquor was re-introduced into column 10 and reaction zone 11 therein, but beneath plates 20 and the gas washing area in the upper portion of column 10, while 11.2 liters per hours of plain water were introduced at the top of column 10 through spray head 21 thereof for the gas washing step (which utilized three plates 20 in order to facilitate liquid-gas contact).

Merely as further illustrative, several special measurements were taken for further accumulation of data and, particularly, with regard to the concentration of hexa in the various aqueous solutions at the different plates 20, showing, at the upper plate, a mean value of hexa concentration of 0.28R by weight, at the middle plate 3.9%, and at the lower plate 4.7%, as some indication of the extent of actual formaldehyde-ammonia reaction in the gas washing portion of column 10 and when plain water is introduced through spray head 21.

The final yield of hexa, after completion of the operation described, was 99.7% based on formaldehyde input and 98.5% based on ammonia input.

As will be apparent from the foregoing, then, there are provided in accordance herewith a system of apparatus and process steps for the synthetic production of hexa by reaction of formaldehyde and ammonia in a continuous manner and at optimum and self-regulating or automatically controlled reaction temperature, and actually without the necessity for external cooling provisions or vacuum operation notwithstanding the highly exothermic nature of the reaction. Similarly, the production and operating controls in accordance herewith are maintained, for any particularly desired product concentration and/or for various feed reactant characteristics, merely by simple control of water balance throughput in the system and/or maintaining a certain constant liquid level in the reaction zone by adjusting diluting water input thereinto to assure that water vapor swept out of the system by inert gas throughput equals water input (by controlled dilution of mother liquor or reactants) plus water formed as a product of the desired synthesis reaction.

While the methods and systems of apparatus described herein form preferred embodiments of this invention, this invention is not limited to these precise methods and systems of apparatus, and modifications may be made therein without departing from the scope of this invention which is defined in the appended claims.

What is claimed is:

1. In a process of the character described for synthesizing hexamethylene tetramine by the reaction of formaldehyde and ammonia, the steps which comprise continuously introducing anhydrous ammonia and a gaseous mixture containing formaldehyde into a reaction zone containing a substantially saturated aqueous solution of hexamethylene tetramine for reaction of said ammonia and formaldehyde in said solution to form hexamethylene tetramine and water, continuously withdrawing from said reaction zone portions of said aqueous solution and said hexamethylene tetramine formed therein as a saturated mother liquor having dispersed crystals of hexamethylene tetramine, separating said hexamethylene tetramine crystals from said mother liquor and recovering said crystals, diluting said separated mother liquor to a less saturated aqueous solution, recycling said less saturated solution through said reaction zone for formation of additional amounts of hexamethylene tetramine therein, and controlling the rate of said withdrawal of mother liquor from said reaction zone and the extent of said diluting of said recycled solution for maintaining a substantially constant liquid volume in said reaction zone.

2. A process as recited in claim 1 in which the temperature of said reaction zone is maintained in the range of about 62° to 66° C. at substantially atmospheric pressure.

3. In a process of the character described for synthesizing hexamethylene tetramine by the reaction of formaldehyde and ammonia, the steps which comprise continuously introducing anhydrous ammonia and a gaseous mixture containing formaldehyde into a reaction zone containing a substantially saturated aqueous solution of hexamethylene tetramine for reaction of said ammonia and formaldehyde in said solution to form hexamethylene tetramine and water, continuously withdrawing from said reaction zone portions of said aqueous solution and said hexamethylene tetramine formed therein as a saturated mother liquor having dispersed crystals of hexamethylene tetramine, continuously removing water from said reaction zone as water vapor, separating said hexamethylene tetramine crystals from said mother liquor and recovering said crystals, diluting said separated mother liquor to a less saturated aqueous solution, recycling said less saturated solution through said reaction zone for formation of additional amounts of hexamethylene tetramine therein, and controlling the rate of said withdrawal of mother liquor from said reaction zone and the extent of said diluting of said recycled solution for maintaining the quantity of water introduced and formed in said reaction zone substantially equal to the quantity of water removed therefrom.

4. A process as recited in claim 3 in which said separated mother liquor is diluted with water to form said less saturated solution prior to introduction thereof into said reaction zone.

5. A process as recited in claim 3 in which said separated mother liquor is introduced into said reaction zone prior to said diluting thereof, and in which additional water for forming less saturated solution is separately introduced into said reaction zone.

6. A process as recited in claim 3 in which said anhydrous ammonia is introduced into said reaction zone in gaseous form.

7. A process as recited in claim 3 in which said anhydrous ammonia is introduced into said reaction zone in liquid form.

8. In a process of the character described for synthesizing hexamethylene tetramine by the reaction of formaldehyde and ammonia for continuous operation, the steps which comprise continuously introducing anhydrous ammonia and a gaseous mixture containing formaldehyde admixed with other gases substantially inert in said reaction into a reaction zone containing a substantially saturated aqueous solution of hexamethylene tetramine for reaction of said ammonia and formaldehyde in said solution to form hexamethylene tetramine and water, continuously withdrawing from said reaction zone portions of said aqueous solution and said hexamethylene tetramine formed therein as a saturated mother liquor having dispersed crystals of hexamethylene tetramine, continuously evolving from said reaction zone said other substantially inert gases for removing water from said reaction zone as water vapor, separating said hexamethylene tetramine crystals from said mother liquor and recovering said crystals, diluting said separated mother liquor to a less saturated aqueous solution, recycling said less saturated solution through said reaction zone for formation of additional amounts of hexamethylene tetramine therein, and controlling the rate of said withdrawal of mother liquor from said reaction zone and the extent of said diluting of said recycled solution for maintaining the quantity of water introduced and formed in said reaction zone substantially equal to the quantity of water removed therefrom by said evolving inert gases.

9. A process as recited in claim 8 in which said evolving gases are washed with said diluted mother liquor solution for returning to said reaction zone formaldehyde and ammonia entrained in said evolving gases.

10. A process as recited in claim 8 in which said evolving gases are washed with water for returning to said reaction zone formaldehyde and ammonia entrained in said evolving gases.

11. A process as recited in claim 8 in which formaldehyde is present in an amount about 6% by volume of said gaseous mixture containing formaldehyde and introduced into said reaction zone.

12. A process as recited in claim 8 in which the temperature of said reaction zone and said reaction therein is maintained in the range of about 62° to 66° C. while the pressure therein is substantially atmospheric.

References Cited by the Examiner

UNITED STATES PATENTS

| | | | |
|---|---|---|---|
| 1,566,820 | 12/1925 | Carter | 260—248.6 |
| 1,635,707 | 7/1927 | Carter | 260—248.6 |
| 2,449,040 | 9/1948 | Schideler et al. | 260—248.6 |
| 2,646,345 | 7/1953 | Otto | 23—273 X |
| 2,805,125 | 9/1957 | Van Ackeren | 23—273 X |
| 2,865,919 | 12/1958 | Ludwig et al. | 260—248.6 |
| 2,950,180 | 8/1960 | Kunzer et al. | 23—283 |
| 3,057,700 | 10/1962 | Gross | 23—283 |
| 3,061,608 | 10/1962 | Millikan | 260—248.6 |
| 3,079,420 | 2/1963 | Sennewald et al. | 260—283 X |

OTHER REFERENCES

Baur et al.: "Helv. Chim. Acta.," vol. 24, pp. 754–60 (1941).

Richmond et al.: "Journal of the Am. Chem. Soc.," vol. 70, pp. 3659–64 (1948).

WALTER A. MODANCE, *Primary Examiner.*

NICHOLAS S. RIZZO, *Examiner.*

M. W. WESTERN, JOHN M. FORD,
*Assistant Examiners.*